US008972184B2

(12) United States Patent
Hwang et al.

(10) Patent No.: US 8,972,184 B2
(45) Date of Patent: Mar. 3, 2015

(54) APPARATUS AND METHOD FOR DETERMINING ORBIT OF GEOSTATIONARY SATELLITE

(71) Applicant: Electronics and Telecommunications Research Institute, Daejeon (KR)

(72) Inventors: Yoo La Hwang, Daejeon (KR); Byoung Sun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/829,662

(22) Filed: Mar. 14, 2013

(65) Prior Publication Data

US 2014/0055299 A1   Feb. 27, 2014

(30) Foreign Application Priority Data

Aug. 24, 2012   (KR) .......................... 10-2012-0092768

(51) Int. Cl.
| | | |
|---|---|---|
| *G01C 21/24* | (2006.01) | |
| *G01S 19/42* | (2010.01) | |
| *G01S 19/14* | (2010.01) | |
| *H04B 7/185* | (2006.01) | |
| *H04W 24/00* | (2009.01) | |

(52) U.S. Cl.
CPC ......... *G01S 19/42* (2013.01); *G01S 19/14* (2013.01)
USPC .......... 701/531; 701/475; 701/490; 455/13.1; 455/457

(58) Field of Classification Search
CPC .......... G01S 19/42; G01S 15/06; G01S 19/00

USPC ......... 701/213, 475, 531, 490; 455/13.1, 457; 342/357.77
See application file for complete search history.

(56) References Cited

U.S. PATENT DOCUMENTS

| | | | | |
|---|---|---|---|---|
| 5,774,829 | A  * | 6/1998 | Cisneros et al. ............. | 701/475 |
| 7,107,007 | B1 * | 9/2006 | Lee et al. .................... | 455/13.1 |
| 2002/0149514 | A1 | 10/2002 | Fichter et al. | |
| 2004/0116134 | A1 * | 6/2004 | Maeda et al. ................ | 455/457 |
| 2008/0195318 | A1 * | 8/2008 | Choi ............................ | 701/213 |
| 2011/0254734 | A1 * | 10/2011 | Li et al. ................... | 342/357.77 |
| 2011/0294416 | A1 | 12/2011 | Celerier | |

FOREIGN PATENT DOCUMENTS

JP   11183528   *  9/1999

OTHER PUBLICATIONS

English Translation for JP11-183582.*

* cited by examiner

*Primary Examiner* — Helal A Algahaim
*Assistant Examiner* — Mahmoud Ismail
(74) *Attorney, Agent, or Firm* — William Park & Associates Patent Ltd.

(57) ABSTRACT

An apparatus and method for determining an orbit of a geostationary satellite is provided. The orbit of the geostationary satellite may be determined using at least one pseudo-range of the geostationary satellite calculated based on an orbit and a position of at least one global positioning system (GPS) satellite, position information of the geostationary satellite, and an angle between the geostationary satellite and each GPS satellite.

25 Claims, 6 Drawing Sheets

APPARATUS AND METHOD FOR DETERMINING ORBIT OF GEOSTATIONARY SATELLITE

CROSS-REFERENCE TO RELATED APPLICATION

This application claims the priority benefit of Korean Patent Application No. 10-2012-0092768, filed on Aug. 24, 2012, in the Korean Intellectual Property Office, the disclosure of which is incorporated herein by reference.

BACKGROUND

1. Field of the Invention

Exemplary embodiments of the present invention relate to an apparatus and method for determining an orbit of a geostationary satellite using global positioning system (GPS) satellite data.

2. Description of the Related Art

A degree of accuracy of a position of a geostationary satellite is known to be within several kilometers (km) when an orbit of the geostationary satellite is determined using ranging data and tracking data from a single ground station.

Dissimilar to a communication satellite, this degree of position accuracy may present an issue with a weather satellite or other satellites requiring a high-precision image. To obtain high-precision image data, the demand for a high level of position accuracy exists.

To meet the demand, data measured from at least three ground stations is required.

However, a longitudinal location of a geostationary satellite is so close to that of a single ground station that it is difficult to estimate an azimuthal bias when a geometric singularity is found in azimuth measurements.

Also, an increase in a number of ground stations increases costs incurred in determining an orbit.

SUMMARY

According to an aspect of the present invention, there is provided an apparatus for determining an orbit of a geostationary satellite, including a data calculating unit to calculate an orbit and a position of at least one global positioning system (GPS) satellite, a measuring unit to measure position information of a geostationary satellite relative to a ground station, an angle calculating unit to calculate an angle between the geostationary satellite and each of the at least one GPS satellite, a pseudo-range calculating unit to calculate at least one pseudo-range of the geostationary satellite using the orbit and the position of the at least one GPS satellite, the position information of the geostationary satellite, and the angle between the geostationary satellite and each of the at least one GPS satellite, and a position determining unit to determine an orbit of the geostationary satellite using the pseudo-range.

The position information of the geostationary satellite may include a distance, an azimuth angle, and an elevation angle of the geostationary satellite relative to the ground station.

The measuring unit may measure the position information of the geostationary satellite through antenna tracking from the ground station.

The data calculating unit may calculate an ephemeris of a GPS satellite matching a time interval involved in measuring the position information of the geostationary satellite, among the at least one GPS satellite.

The measuring unit may calculate an elevation difference between the geostationary satellite and each of the at least one GPS satellite relative to the ground station.

According to another aspect of the present invention, there is provided a method of determining an orbit of a geostationary satellite, including calculating an orbit and a position of at least one GPS satellite, measuring position information of a geostationary satellite relative to a ground station, calculating an angle between the geostationary satellite and each GPS satellite, calculating at least one pseudo-range of the geostationary satellite using the orbit and the position of the at least one GPS satellite, the position information of the geostationary satellite, and the angle between the geostationary satellite and each GPS satellite, and determining an orbit of the geostationary satellite using the pseudo-range.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

An apparatus for determining an orbit of a geostationary satellite according to an exemplary embodiment of the present invention may calculate an exact position of a global positioning system (GPS) satellite corresponding to ranging and antenna tracking measurements, using interpolation from a ground station executing ranging and antenna tracking operations for a geostationary satellite periodically.

The apparatus for determining an orbit of a geostationary satellite may calculate a position of the geostationary satellite accurately based on geometric characteristics of the position of the GPS satellite.

Figure 1:
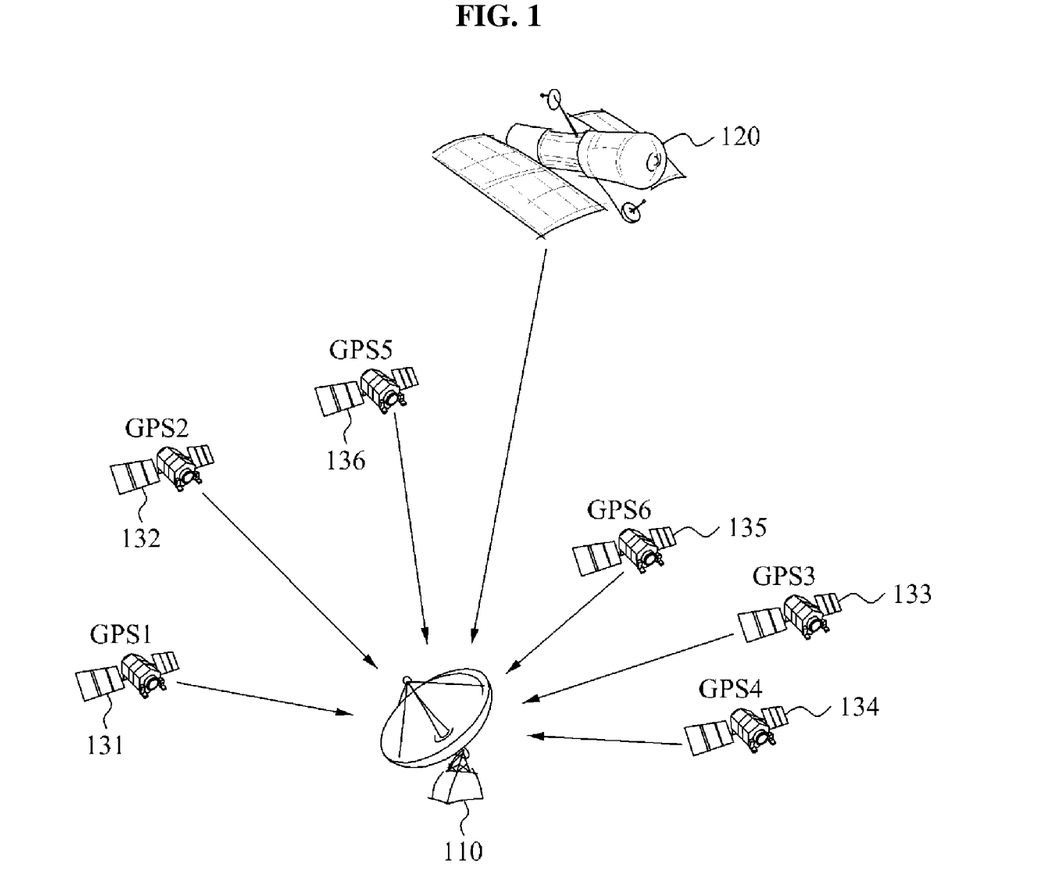
FIG. 1 is a diagram illustrating a communication connection between a ground station, a geostationary satellite, and a plurality of global positioning system (GPS) satellites according to an exemplary embodiment of the present invention.

FIG. 1 is a diagram illustrating a communication connection between a ground station 110, a geostationary satellite 120, and a plurality of GPS satellites 131 through 136 according to an exemplary embodiment of the present invention.

Referring to FIG. 1, the apparatus for determining an orbit of a geostationary satellite may determine the orbit of the geostationary satellite 120 accurately by the ground station 110 measuring distances and angles for the geostationary satellite 120 and each of the GPS satellites 131 through 136, through ranging and antenna tracking.

Figure 2:
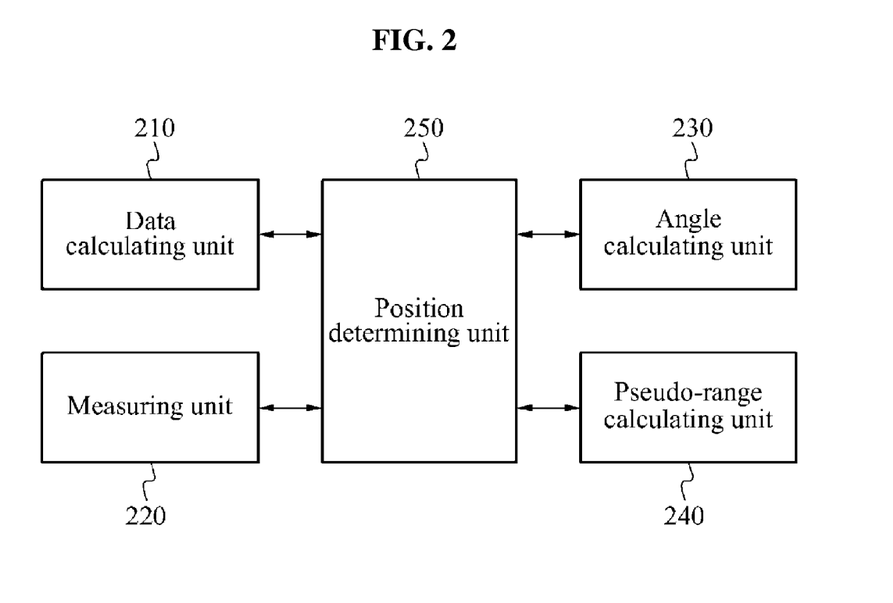
FIG. 2 is a block diagram illustrating a structure of an apparatus for determining an orbit of a geostationary satellite according to an exemplary embodiment of the present invention.

FIG. 2 is a block diagram illustrating a structure of the apparatus for determining an orbit of a geostationary satellite according to an exemplary embodiment of the present invention.

Referring to FIG. 2, the apparatus for determining an orbit of a geostationary satellite may include a data calculating unit 210, a measuring unit 220, an angle calculating unit 230, a pseudo-range calculating unit 240, and a position determining unit 250.

The data calculating unit 210 may calculate an orbit and a position of at least one GPS satellite.

The data calculating unit 210 may calculate an ephemeris of a GPS satellite matching a time interval involved in measuring position information of the geostationary satellite, among the at least one GPS satellite.

The measuring unit 220 may measure the position information of the geostationary satellite relative to the ground station. The position information of the geostationary satellite may include a distance, an azimuth angle, and an elevation angle of the geostationary satellite relative to the ground station.

The measuring unit 220 may measure the position information of the geostationary satellite through antenna tracking from the ground station, and may calculate an elevation difference between the geostationary satellite and each GPS satellite relative to the ground station.

The angle calculating unit 230 may calculate an angle θ between the geostationary satellite and each GPS satellite. For example, the angle calculating unit 230 may calculate the angle θ between the geostationary satellite and the GPS satellite through Equation 1.

$$\theta = \cos^{-1}(\cos \Delta\alpha \cos \Delta\alpha) \qquad \text{[Equation 1]}$$

where Δα denotes an azimuth difference between the geostationary satellite and the GPS satellite and Δθ denotes an elevation difference between the geostationary satellite and the GPS satellite.

The pseudo-range calculating unit 240 may calculate at least one pseudo-range of the geostationary satellite using the orbit and the position of the at least one GPS satellite, the position information of the geostationary satellite, and the angle between the geostationary satellite and each GPS satellite.

The pseudo-range calculating unit 240 may calculate the at least one pseudo-range $r_i$ through Equation 2.

$$r_i = \sqrt{(R_i s)^2 + r^2 - 2r(R_i s)\cos\theta_i} \qquad \text{[Equation 2]}$$

where $\theta_i$ denotes an angle between the geostationary satellite and the GPS satellite, $r_i$ denotes a distance between the ground station and the geostationary satellite, and $R_i s$ corresponds to a distance between the ground station and the GPS satellite.

The pseudo-range calculating unit 240 may calculate the at least one pseudo-range $r_i$ through Equation 3.

$$r_i = \text{squrt}((X-x_i)^2 + (Y-y_i)^2 + (Z-z_i)^2) \qquad \text{[Equation 3]}$$

where X, Y, and Z denote location coordinates of the geostationary satellite, and $x_i$, $y_i$, and $z_i$ correspond to location coordinates of the GPS satellite.

The pseudo-range calculating unit 240 may calculate a matrix $A_i$ for a relationship between the geostationary satellite and the GPS satellite through Equation 4.

$$A_i = \begin{bmatrix} \frac{(X-x_i)}{r_i} & \frac{(Y-y_i)}{r_i} & \frac{(Z-z_i)}{r_i} \\ & \vdots & \\ \frac{(X-x)}{r} & \frac{(Y-y)}{r} & \frac{(Z-z)}{r} \end{bmatrix} \qquad \text{[Equation 4]}$$

The position determining unit 250 may determine the orbit of the geostationary satellite using the pseudo-range.

The position determining unit 250 may determine the location coordinates X of the geostationary satellite through Equation 5.

$$X = (A_i^T W A_i)^{-1} A_i^T r_i \qquad \text{[Equation 5]}$$

where W corresponds to a weight value for geometric dilution of precision (GDOP). For example, a high weight value may be applied to data with good GDOP, and a low weight value may be applied to data with poor GDOP.

Hereinafter, the determining of the position of the geostationary satellite using the position information of the plurality of GPS satellites and the position information of the geostationary satellite received from the ground station is described in further detail.

Figure 3:
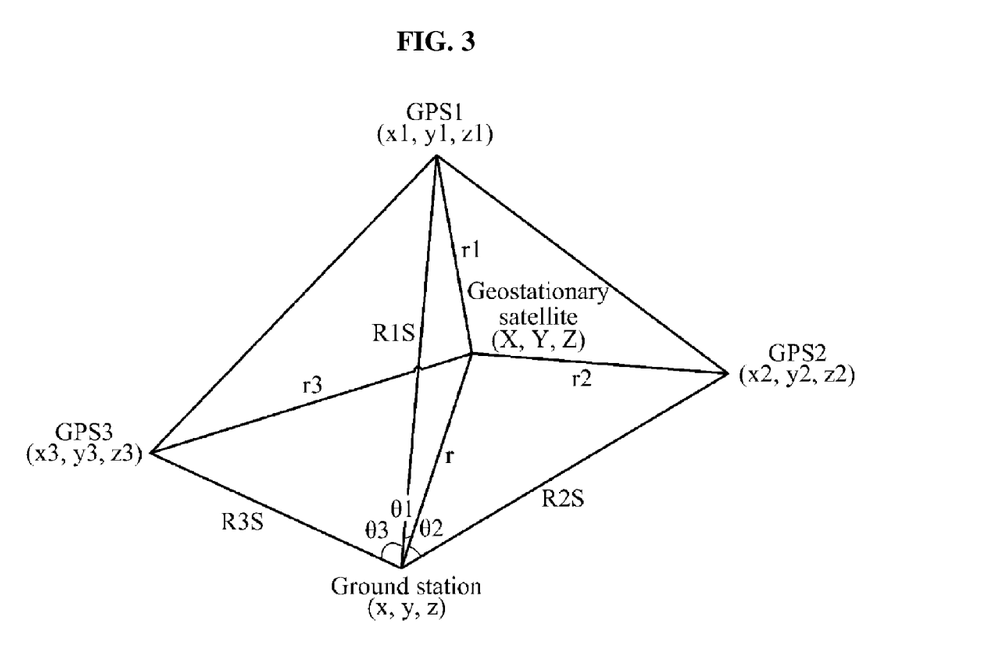
FIG. 3 is a diagram illustrating a system for determining an orbit of a geostationary satellite according to an exemplary embodiment of the present invention.

FIG. 3 is a diagram illustrating a system for determining the orbit of the geostationary satellite according to an exemplary embodiment of the present invention.

Referring to FIG. 3, the ground station may be used to control the geostationary satellite. The ground station may include a GPS receiver, and synchronization in time between the entire system and the GPS receiver may be implemented.

A distance between the geostationary satellite (X, Y, Z) and each of GPS1 (x1, y1, z1), GPS2 (x2, y2, z2), and GPS3 (x3, y3, z3), and a distance between the geostationary satellite (X, Y, Z) and the ground station (x, y, z) may be represented by Equation 6.

$$r1 = sqrt((X-x1)\wedge 2 + (Y-y1)\wedge 2 + (Z-z1)\wedge 2) \qquad \text{[Equation 6]}$$
$$r2 = sqrt((X-x2)\wedge 2 + (Y-y2)\wedge 2 + (Z-z2)\wedge 2)$$
$$r3 = sqrt((X-x3)\wedge 2 + (Y-y3)\wedge 2 + (Z-z3)\wedge 2)$$
$$\vdots$$
$$r = sqrt((X-x)\wedge 2 + (Y-y)\wedge 2 + (Z-z)\wedge 2)$$

For example, the pseudo-range r1 may be calculated based on this geometric relationship.

In Equation 6, 'r' denotes a distance between the ground station and the geostationary satellite, and R1s, R2s, and R3s denote a distance between the ground station and each of the GPS satellites GPS1, GPS2, and GPS3. Also, θ1, θ2, and θ3 denote an angle between the geostationary satellite and each of the GPS satellites GPS1, GPS2, and GPS3 relative to the ground station, and may be calculated using a distance, an azimuth angle, and an elevation angle of the geostationary satellite relative to the ground station.

Figure 4:
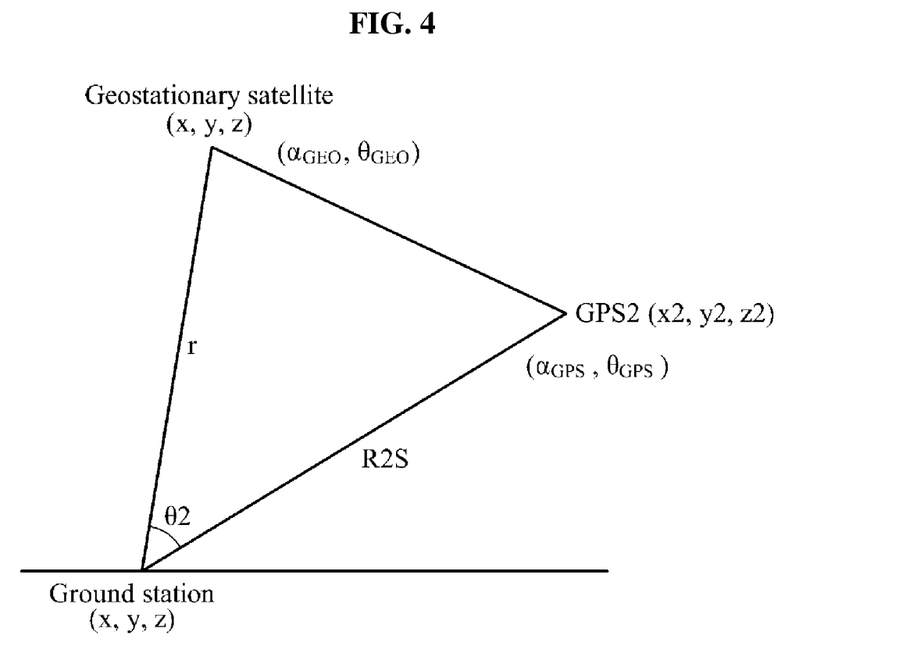
FIG. 4 is a diagram illustrating an angle between a geostationary satellite and a GPS satellite according to an exemplary embodiment of the present invention.

FIG. 4 is a diagram illustrating the angle between the geostationary satellite and the GPS satellite according to an exemplary embodiment of the present invention.

Referring to FIG. 4, the ground station may recognize an exact location of the GPS satellite through antenna tracking.

Accordingly, the ground station may calculate an azimuth angle and an elevation angle of the GPS satellite accurately.

The angles θ1, θ2, and θ3 between the geostationary satellite and the GPS satellites GPS1, GPS2, and GPS3 may be calculated by substituting an azimuth difference and an elevation difference between the geostationary satellite and each of the GPS satellites GPS1, GPS2, and GPS3 into a right spherical triangle formula.

Figure 5:
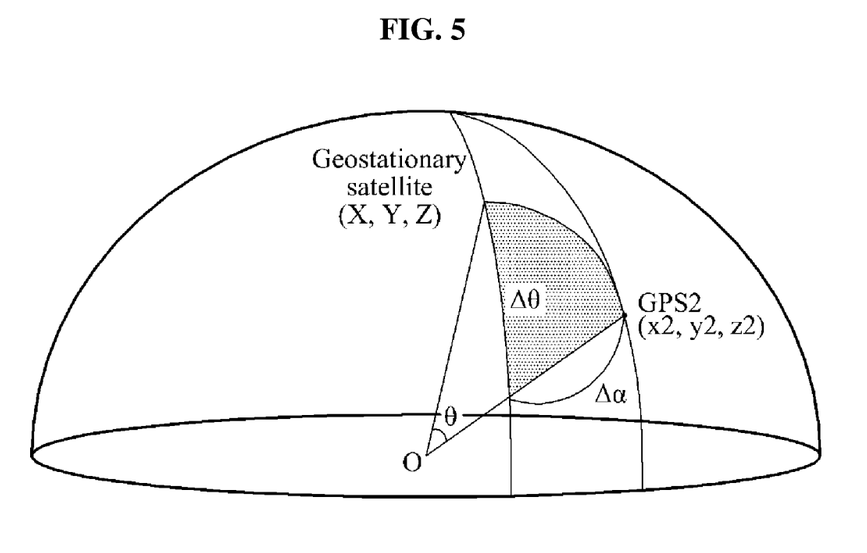
FIG. 5 is a diagram illustrating an example of a right spherical triangle used for calculating an angle between a geostationary satellite and a GPS satellite according to an exemplary embodiment of the present invention.

FIG. 5 is a diagram illustrating an example of a right spherical triangle used for calculating the angle between the geostationary satellite and the GPS satellite according to an exemplary embodiment of the present invention.

The angle between the geostationary satellite and the GPS satellite may be calculated as described in the foregoing.

The angle θ between the geostationary satellite and each of the GPS satellites GPS1, GPS2, and GPS3 may correspond to θ1, θ2, and θ3 of FIG. 3. Δα may correspond to an azimuth difference between the geostationary satellite and the GPS satellite relative to the ground station, and Δθ may correspond to an elevation difference between the geostationary satellite and the GPS satellite relative to the ground station.

Using the azimuth difference and the elevation difference, the angle between the geostationary satellite and the GPS satellite may be calculated through Equations 1 through 6 and Equation 7.

$$r1 = \sqrt{(R1s)^2 + r^2 - 2r(R1s)\cos\theta 1}$$

$$r2 = \sqrt{(R2s)^2 + r^2 - 2r(R2s)\cos\theta 2}$$

$$r3 = \sqrt{(R3s)^2 + r^2 - 2r(R3s)\cos\theta 3}$$

[Equation 7]

The angles θ1, θ2, and θ3 between the geostationary satellite and each of the GPS satellites may be calculated as shown in FIG. 3. The pseudo-ranges r1, r2, and r3 may be calculated using the second version rule of the cosine rule.

A bias or an error included in the measured data, for example, a satellite clock error, an ionosphere error, a convention zone error, a multipath error, and the like, may be removed from the distances R1s, R2s, and R3s between the ground station and each of the GPS satellites GPS1, GPS2, and GPS3.

The matrix $A_i$ for the relationship between the geostationary satellite and each GPS satellite may be calculated through Equation 4. In this instance, the distance between the ground station and the geostationary satellite in Equation 1 may be included in the matrix A.

At least three pseudo-ranges may be estimated, and using the at least three pseudo-ranges, location coordinates (X, Y, Z) of the geostationary satellite may be estimated. In this instance, a least square estimator (LSE) may be used in a time series.

Based on DOP between the geostationary satellite and each GPS satellite relative to the ground station, a most suitable GDOP for determining the position may be calculated, and the position of the geostationary satellite may be estimated by setting the GPS satellites based on the configuration of Equation 2.

When the Equations defined in the foregoing is applied to GPS satellites having an elevation angle of 0 degrees or higher enabling communication from the ground station, r4, r5, and r6 and θ4, θ5, and θ6 may be calculated.

A more accurate position of the geostationary satellite may be obtained by applying Equation 5 using a batch least square estimator (BLSE) filter.

Since the apparatus for determining an orbit of a geostationary satellite is able to process all visible GPS satellite data, the orbit of the geostationary satellite may be determined at each (*period? epoch using a large amount of observed data during the same period of time. Also, the orbit of the geostationary satellite may be determined by conducting BLSE of data for a predetermined length of time, for example, one day, two days, three days, and the like.

Figure 6:
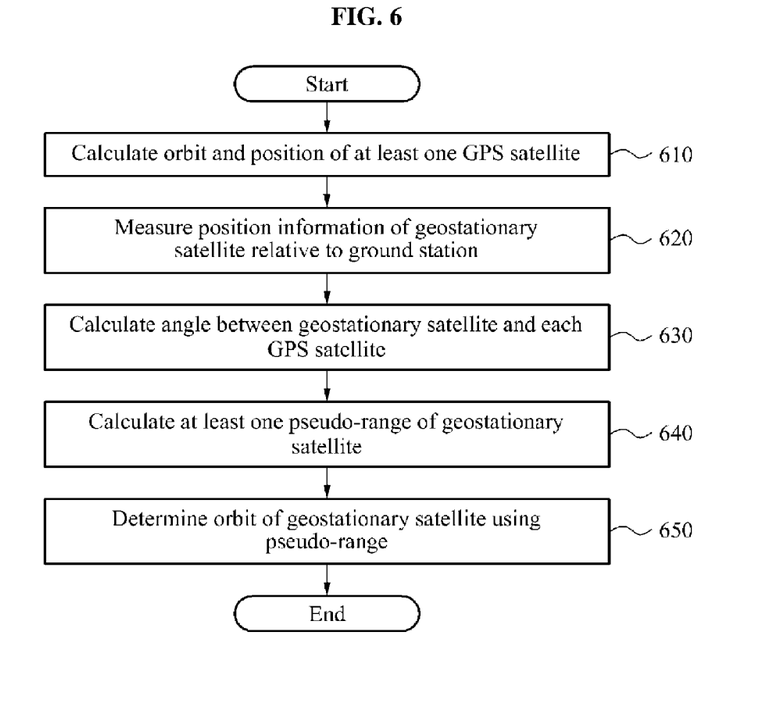
FIG. 6 is a flowchart illustrating a method of determining an orbit of a geostationary satellite according to an exemplary embodiment of the present invention.

FIG. 6 is a flowchart illustrating a method of determining an orbit of a geostationary satellite according to an exemplary embodiment of the present invention.

Referring to FIG. 6, in operation 610, the apparatus for determining an orbit of a geostationary satellite may calculate an orbit and a position of at least one GPS satellite.

In operation 620, the apparatus may measure position information of a geostationary satellite relative to a ground station.

In operation 630, the apparatus may calculate an angle between the geostationary satellite and each GPS satellite.

In operation 640, the apparatus may calculate at least one pseudo-rage of the geostationary satellite using the orbit and the position of the at least one GPS satellite, the position information of the geostationary satellite, and the angle between the geostationary satellite and each GPS satellite.

In operation 650, the apparatus may determine the orbit of the geostationary satellite using the pseudo-range.

According to an aspect of the present invention, the apparatus for determining an orbit of a geostationary satellite may determine the position of the geostationary satellite using distance data of the GPS satellite and data of the geostationary satellite including a distance, an azimuth angle, and an elevation angle.

According to another aspect of the present invention, the apparatus for determining an orbit of a geostationary satellite may remove an azimuth bias of a single ground station using position information of the GPS satellite to determine the position of the geostationary satellite accurately using at least one pseudo-range.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. For example, suitable results may be achieved if the described techniques are performed in a different order and/or if components in a described system, architecture, device, or circuit are combined in a different manner and/or replaced or supplemented by other components or their equivalents.

Accordingly, it is intended that the present invention cover the modifications and variations of this invention provided they come within the scope of the appended claims and their equivalents.

What is claimed is:

1. A method comprising:
calculating, by an apparatus, an orbit and a position of at least one global positioning system (GPS) satellite;
measuring, utilizing an antenna, position information of a geostationary satellite relative to a ground station;
calculating, by the apparatus, an angle between the geostationary satellite and each of the at least one GPS satellite based on the relation $$\theta = \cos^{-1}(\cos \Delta\alpha \cos \Delta\theta)$$

where $\Delta\alpha$ denotes an azimuth difference between the geostationary satellite and each of the at least one GPS satellite, and $\Delta\theta$ denotes an elevation difference between the geostationary satellite and each of the at least one GPS satellite;
calculating, by the apparatus, at least one pseudo-range of the geostationary satellite using the orbit and the position of the at least one GPS satellite, the position information of the geostationary satellite, and the angle between the geostationary satellite and each of the at least one GPS satellite; and
determining, by the apparatus, an orbit of the geostationary satellite using the pseudo-range and a weight value for geometric dilution of precision (GDOP) of position data.

2. The method of claim 1, wherein the position information of the geostationary satellite comprises a distance, an azimuth angle, and an elevation angle of the geostationary satellite relative to the ground station.

3. The method of claim 1, wherein the measuring further comprises measuring the position information of the geostationary satellite through antenna tracking from the ground station.

4. The method of claim 1, further comprising calculating an ephemeris of a GPS satellite matching a time interval involved in measuring the position information of the geostationary satellite, among the at least one GPS satellite.

5. The method of claim 1, further comprising calculating an elevation difference between the geostationary satellite and each of the at least one GPS satellite relative to the ground station.

6. The method of claim 1, further comprising calculating the at least one pseudo-range $r_i$ based on the relation $$r_i = \sqrt{(R_i s)^2 + r^2 - 2r(R_i s)\cos\theta_i}$$

where $\theta_i$ denotes an angle between the geostationary satellite and an ith GPS satellite, $r_i$ denotes a distance between the ground station and the geostationary satellite, and $R_i s$ corresponds to a distance between the ground station and the ith GPS satellite.

7. The method of claim 1, further comprising calculating the at least one pseudo-range $r_i$ based on the relation $$r_i = \operatorname{sqrt}((X-x_i)^2 + (Y-y_i)^2 + (Z-z_i)^2)$$

where X, Y, and Z denote location coordinates of the geostationary satellite, and $x_i$, $y_i$, and $z_i$ correspond to location coordinates of an ith GPS satellite.

8. The method of claim 7, further comprising calculating a matrix $A_i$ for a relationship between the geostationary satellite and an ith GPS satellite based on the relation $$A_i = \begin{bmatrix} \frac{(X-x_i)}{r_i} & \frac{(Y-y_i)}{r_i} & \frac{(Z-z_i)}{r_i} \\ & \vdots & \\ \frac{(X-x)}{r} & \frac{(Y-y)}{r} & \frac{(Z-z)}{r} \end{bmatrix}$$

9. The method of claim 8, further comprising determining location coordinates X of the geostationary satellite based on the relation $$X = (A_i^T W A_i)^{-1} A_i^T r_i$$

where W denotes a weight value for geometric dilution of precision (GDOP), and $r_i$ corresponds to the at least one pseudo-range.

10. A method comprising:
calculating, by an apparatus, an orbit and a position of at least one global positioning system (GPS) satellite;
measuring, utilizing an antenna, position information of a geostationary satellite relative to a ground station;
determining, by a measuring apparatus, at least one elevation difference between the geostationary satellite and the at least one GPS satellite relative to the ground station, respectively;
removing, by the apparatus, at least one error in the at least one elevation difference, wherein the at least one error is at least one of a satellite clock error, an ionosphere error, a convention zone error, and a multipath error, yielding at least one corrected elevation difference;
calculating, by the apparatus, an angle between the geostationary satellite and the at least one GPS satellite based on the relation $$\theta = \cos^{-1}(\cos \Delta\alpha \cos \Delta\theta)$$

where $\Delta\alpha$ denotes an azimuth difference between the geostationary satellite and each of the at least one GPS satellite, and $\Delta\theta$ denotes an elevation difference between the geostationary satellite and each of the at least one GPS satellite;
estimating, by the apparatus, at least one pseudo-range of the geostationary satellite using the orbit and the position of the at least one GPS satellite, the position information of the geostationary satellite, the at least one corrected elevation difference, and the angle between the geostationary satellite and each of the at least one GPS satellite; and
determining, by the apparatus, an orbit of the geostationary satellite using the pseudo-range.

11. The method of claim 10, wherein the position information of the geostationary satellite comprises a distance, an azimuth angle, and an elevation angle of the geostationary satellite relative to the ground station.

12. The method of claim 10, further comprising calculating an ephemeris of a first GPS satellite matching a time interval involved in measuring the position information of the geostationary satellite, among the at least one GPS satellite.

13. The method of claim 10, wherein the calculating of the at least one pseudo-range comprises calculating the at least one pseudo-range $r_i$ based on the relation $$r_i = \sqrt{(R_i s)^2 + r^2 - 2r(R_i s)\cos\theta_i}$$

where $\theta_i$ denotes an angle between the geostationary satellite and an ith GPS satellite, $r_i$ denotes a distance between the ground station and the geostationary satellite, and $R_i s$ corresponds to a distance between the ground station and the ith GPS satellite.

14. The method of claim 10, wherein the calculating of the at least one pseudo-range comprises calculating the at least one pseudo-range $r_i$ based on the relation $r_i$=squrt$((X-x_i)^2+(Y-y_i)^2+(Z-z_i)^2)$ where X, Y, and Z denote location coordinates of the geostationary satellite, and $x_i$, $y_i$, and $z_i$ correspond to location coordinates of an ith GPS satellite.

15. The method of claim 14, wherein the calculating of the at least one pseudo-range further comprises calculating a matrix $A_i$ for a relationship between the geostationary satellite and an ith GPS satellite based on the relation $$A_i = \begin{bmatrix} \frac{(X-x_i)}{r_i} & \frac{(Y-y_i)}{r_i} & \frac{(Z-z_i)}{r_i} \\ & \vdots & \\ \frac{(X-x)}{r} & \frac{(Y-y)}{r} & \frac{(Z-z)}{r} \end{bmatrix}$$

16. The method of claim 15, wherein the determining of the orbit of the geostationary satellite comprises determining location coordinates X of the geostationary satellite based on the relation $X=(A_i^T W A_i)^{-1} A_i^T r_i$ where W denotes a weight value for geometric dilution of precision (GDOP), and $r_i$ corresponds to the at least one pseudo-range.

17. A method comprising:
calculating, by an apparatus, an orbit and a position of at least one global positioning system (GPS) satellite;
measuring, utilizing an antenna, position information of a geostationary satellite relative to a ground station;
calculating, by the apparatus, an angle between the geostationary satellite and each of the at least one GPS satellite;
calculating, by the apparatus, at least one pseudo-range of the geostationary satellite using the orbit and the position of the at least one GPS satellite, the position information of the geostationary satellite, and the angle between the geostationary satellite and each of the at least one GPS satellite, based on the relation $r_i=\sqrt{(R_i s)^2+r^2-2r(R_i s)\cos\theta_i}$ where $\theta_i$ denotes an angle between the geostationary satellite and an ith GPS satellite, $r_i$ denotes a distance between the ground station and the geostationary satellite, and $R_i s$ corresponds to a distance between the ground station and the ith GPS satellite; and
determining, by the apparatus, an orbit of the geostationary satellite using the pseudo-range and a weight value for geometric dilution of precision (GDOP) of position data.

18. The method of claim 17, wherein the position information of the geostationary satellite comprises a distance, an azimuth angle, and an elevation angle of the geostationary satellite relative to the ground station.

19. The method of claim 17, wherein the measuring further comprises measuring the position information of the geostationary satellite through antenna tracking from the ground station.

20. The method of claim 17, further comprising calculating an ephemeris of a GPS satellite matching a time interval involved in measuring the position information of the geostationary satellite, among the at least one GPS satellite.

21. The method of claim 17, further comprising calculating an elevation difference between the geostationary satellite and each of the at least one GPS satellite relative to the ground station.

22. The method of claim 17, further comprising calculating the angle θ between the geostationary satellite and each of the at least one GPS satellite based on the relation θ=cos$^{-1}$(cos Δα cos Δθ)

where Δα denotes an azimuth difference between the geostationary satellite and the at least one GPS satellite, and Δθ denotes an elevation difference between the geostationary satellite and each of the at least one GPS satellite.

23. The method of claim 17, further comprising calculating the at least one pseudo-range $r_i$ based on the relation $r_i$=squrt$((X-x_i)^2+(Y-y_i)^2+(Z-z_i)^2)$ where X, Y, and Z denote location coordinates of the geostationary satellite, and $x_i$, $y_i$, and $z_i$ correspond to location coordinates of an ith GPS satellite.

24. The method of claim 23, further comprising calculating a matrix $A_i$ for a relationship between the geostationary satellite and an ith GPS satellite based on the relation $$A_i = \begin{bmatrix} \frac{(X-x_i)}{r_i} & \frac{(Y-y_i)}{r_i} & \frac{(Z-z_i)}{r_i} \\ & \vdots & \\ \frac{(X-x)}{r} & \frac{(Y-y)}{r} & \frac{(Z-z)}{r} \end{bmatrix}.$$

25. The method of claim 24, further comprising determining location coordinates X of the geostationary satellite based on the relation $X=(A_i^T W A_i)^{-1} A_i^T r_i$ where W denotes a weight value for geometric dilution of precision (GDOP), and $r_i$ corresponds to the at least one pseudo-range.

* * * * *